United States Patent [19]

Burke et al.

[11] Patent Number: 5,219,901

[45] Date of Patent: Jun. 15, 1993

[54] ASPHALT CONCRETE COMPOSITION AND METHOD OF MAKING SAME

[75] Inventors: William J. Burke; Sheng H. Lin, both of Tempe, Ariz.; Reui-Fu Ju, Hattiesburg, Miss.

[73] Assignee: Arizona Board of Regents, a body Corporate of the State of Arizona, acting on behalf of the Arizona State University, Tempe, Ariz.

[21] Appl. No.: 558,942

[22] Filed: Jul. 26, 1990

[51] Int. Cl.$^5$ ............................................. C08K 9/00
[52] U.S. Cl. ........................................ 523/205; 524/62; 524/69; 524/71; 428/404; 428/407
[58] Field of Search ................... 523/205; 524/62, 69, 524/71; 428/404, 407

[56] References Cited

U.S. PATENT DOCUMENTS 4,000,095  12/1976  Van Den Berg .................... 524/69

Primary Examiner—Paul R. Michl
Assistant Examiner—Edward Cain
Attorney, Agent, or Firm—Richard R. Mybeck

[57] ABSTRACT

A novel asphalt-aggregate composition in which the aggregate particles and the asphalt are separated by a very thin film of a water insoluble organic polymer. The continuous thin film is formed by treating the aggregate with dilute aqueous emulsion of the polymer. A major amount of hot treated aggregate is thoroughly mixed with a minor amount of hot, free-flowing asphalt to produce a composition useful in road construction and repair, roof maintenance, landfill lining and like application where the integrity of the asphalt must be maintained.

17 Claims, No Drawings

ASPHALT CONCRETE COMPOSITION AND METHOD OF MAKING SAME

INTRODUCTION

The present invention relates to a new and improved asphalt concrete compositions for use in the construction of highways, road maintenance, roof build-up and like applications, and more particularly to methods of preparing and using such compositions to produce an enhanced bond at the asphalt-aggregate interface which substantially reduces the incidence of stripping and rutting in the roadway or rooftop produced therefrom.

BACKGROUND OF THE PRESENT INVENTION

Asphalt compositions are of great commercial importance since about 80% of the paved roads in the United States are composed of asphalt concrete and many of theses roads are urgently in need of repair as a result of increasing highway traffic. Furthermore, asphalt compositions provide the principle roof for thousands of homes throughout the country. Each must avoid stripping and rutting if their designated purpose is to be fulfilled.

The interaction of water and asphalt concrete may, under certain circumstances, cause stripping or loss of adhesion and consequential detachment of the asphalt from the aggregate. The result of such action decreases the cohesive strength of the mixture until it has no inherent structural strength as a paving material and approaches the condition of compacted gravel.

The need for reliable yet inexpensive means and methods to enhance the properties of asphalt concrete composition for road building and maintenance, roofing compositions and other applications, such as liners for waste disposal sites, has never been greater and is further magnified by the compelling need to maintain our nations infrastructure without increasing already outrageous governmental deficits.

In the prior art, sulfur, natural and reclaimed rubber and a variety of synthetic organic polymers have been mixed with the asphalt binder with a view to obtaining improved products. (See: U.S. Pat. Nos. 4,485,201 and 4,446,201) In an alternate, approach vinyl monomers and thermo-setting monomer combinations have been added directly to the asphalt and polymerized in-situ. (See: U.S. Pat. No. 4,333,866). The excessive cost and complex processing procedures required for these materials coupled with only marginal improvement obtained thereby, did not in general make any of these approaches attractive.

In another approach, highly reactive organosilane coupling agents as described in U.S. Pat. No. 4,038,096 and U.S. Pat. No. 4,036,661 were proposed for use in benzene solution to treat the aggregate and for direct addition to the asphalt binder. Such agents, which form organic-inorganic polymers, are reported to improve the anti-stripping properties of the asphalt concrete but are contraindicated because they are toxic and very expensive.

Slurry seal composites, prepared by precoating aggregate with a toluene solution of asphalt (cutback asphalt) containing a resin, were also proposed to improve adhesion but the evaporation of the toluene into the atmosphere creates severe air pollution problems. Treatment of sand with a mixture of an asphalt emulsion and an acrylic emulsion resulted in a composition which was proposed for use in patching or repairing asphalt concrete surfaces at ambient temperatures (U.S. Pat. No. 3,951,895).

Dilute aqueous solutions of water-soluble polymers, such as poly(vinyl alcohol), polyvinylpyrrolidone, and poly(ethylene oxide), are not effective for the use contemplated because the resulting films are sensitive to water and the modified asphalt aggregate compositions are no more resistant to stripping than are the asphalt compositions made from untreated aggregate.

Thus a clear need still exists for means and methods of producing new and improved asphalt concrete compositions which will substantially reduce, if not eliminate, stripping and rutting and the surface detachment and leaks in the asphalt surfaces produced therewith. It is toward the satisfaction of this need that the present invention is directed.

BRIEF SUMMARY OF INVENTION

The present invention relates to improved asphalt-aggregate combinations which have superior anti-stripping and anti-rutting properties when applied as road covering materials, roofing materials, landfill liners and the like. Moreover, such compositions have improved durability and increased resistance to oxidation under atmospheric conditions when compared to conventional asphalt concrete.

Although some progress had been made in the art, as indicated above, it is clear that a definite need exists for an improved durable asphalt-aggregate composition which can be prepared by a simple and economical process involving the use of a small amount of an inexpensive, non-toxic, and environmentally acceptable modifying agent. Further, it is desirable that such an asphalt composition can be created and readily processed using the procedures and equipment which are currently in use to prepare such material for roof and road construction and repair and like applications.

The present invention is predicated on the discovery that the pre-treatment of aggregate with dilute aqueous emulsion of a high molecular weight organic polymer which is soluble in organic solvents and insoluble in water and forms on the discrete particles of aggregate, a thin continuous polymer film which in turn creates a strong bond between asphalt and the pre-coated aggregate when admixed under heated conditions. In this manner, a product is provided which has greatly enhanced properties over those obtainable when untreated aggregate particles are disposed into molten asphalt or when such particles are pretreated with water soluble polymers.

Accordingly, a prime object of the present invention is to provide a new and improved asphalt-concrete composition which is especially useful in the construction and repair of roads, roofing and other related applications.

Another object of the present invention is to provide an improved asphalt concrete composition made from readily available asphalt and aggregate sources and a minor amount of an inexpensive, non-toxic and environmentally friendly modifying agent.

Another object of the present invention is to provide a new and useful asphalt concrete composition in which the aggregate and asphalt are separated by a thin film formed from an organic solvent soluble, water insoluble organic polymer.

A further object of the present invention is to provide a new and improved asphalt concrete composition which, when in place, demonstrates improved resistance to stripping, rutting and oxidation and provides a more durable and serviceable asphalt concrete surface.

Still another object of the present invention is to provide a simple new economic process for coating aggregate particles with a thin water insoluble high molecular weight organic polymer film and embedding said coated particles in asphalt.

These and still further objects, as shall hereinafter appear, are readily fulfilled by the present invention in a remarkably unexpected fashion as will be readily discerned from the following detailed description of exemplary embodiment thereof.

DESCRIPTION OF PREFERRED EMBODIMENTS

The present invention relates to improved asphalt aggregate combinations which have superior anti-stripping and anti-rutting properties when applied as road covering materials, roofing materials, landfill liners and the like. Moreover, such compositions have improved durability and increased resistance to oxidation under atmospheric conditions when compared to conventional asphalt concrete.

The composition of the present invention comprises a system in which an asphalt concrete material is created from a plurality of inorganic aggregate cores, each having a thin film of an organic solvent-soluble, water-insoluble organic polymer formed thereupon and dried and thereafter embedded into an asphalt outer coating.

In one practice of the present invention, a thin polymer film is applied to the individual aggregate particles by admixing the particulate aggregate into and with a dilute aqueous emulsion of an organic solvent-soluble water-insoluble organic polymer, removing the excess emulsion, and thereafter drying the treated aggregate. While the proportion of asphalt can vary with the specific asphalt and particular application, it is found that about 5±2% (by weight) of asphalt, based on total composition, is satisfactory. The asphalt is heated to a temperature at which it flows readily and is then intimately admixed with about 93-97% (weight percent) of the dry treated precoated aggregate particles which have been preheated to a temperature comparable to that obtained by the asphalt to provide a plurality of asphalt embedded precoated aggregate particles. The hot viscous composition is then applied to the surface to be repaired or paved and allowed to cool at ambient temperature. As will hereinafter appear, the compositions and methods hereof produce a vastly improved asphalt concrete surface.

Any of the commercially available asphalts which are commonly used as a binder for aggregate are suitable for use in this invention. The particular asphalt chosen will vary depending on the specific use contemplated for the composition and the indigenous weather conditions to which it will be subject. Viscosity graded AC-20 asphalt has been found to work especially well herewith in the hot arid climate of Arizona and the like.

Electronegative aggregate, such as sand; electropositive aggregate, such as limestone; and aggregates containing both types of materials are suitable for use in this invention. The particular mix of aggregate will depend upon the designated use of the asphalt composition.

In addition to greatly improving the adhesion of the asphalt to the aggregate, the thin film produced in accordance with the present invention protects the asphalt from the inorganic surface charges which could otherwise catalyze the oxidation of the asphalt at the aggregate-asphalt interface. Such oxidation, if permitted, would facilitate the separation of the asphalt from the aggregate and cause the composition to fail in use.

As previously described, organic solvent-soluble, water-insoluble, high molecular weight polymers are preferred for use in the practice of the present invention and include such synthetic vinyl polymers and copolymers as those which are derived from acrylic and methacrylic esters, stryene, vinyl acetate, ethylene, acrylonitrile and 1,3-dienes. Copolymers of neutral monomers with 5 to 10% of itaconic acid, crotonic acid or acrylic acid are effective. For purposes of this invention the term acrylic is meant to include both acrylic and methacrylic acid.

Emulsions formed with organic solvent-soluble, water-insoluble organic polymers derived from natural products, such as ethyl cellulose, and organic solvent-soluble, water-insoluble condensation polymers and copolymers containing amide, ester, ether or polyamide groups can also be used and provide desirable results. In general the film forming organic polymers used in this invention have a molecular weight of at least 10,000 but this can vary somewhat depending upon the nature of the repeating unit in the polymer chain. Many of the vinyl type polymers have molecular weight of up to 100,000 or more.

Good results are obtained with emulsions containing from 0.01 to 2% of polymer solids. Such emulsions are readily prepared by adding q.s. water to commercially available emulsions to obtain the desired concentration. Emulsions having higher solids content can be used but in general these offer no discernible advantage while increasing overall material costs. Emulsions having sufficient stability and wetting ability to permit the formation of a relatively uniform coating of from about 2 to about 10 microns thick over the entire surface of the aggregate particles are preferred.

Particularly good results are obtained with emulsions containing from about 0.1 to about 1% by weight of the designated organic polymers and these are preferred. The use of dilute aqueous polymer emulsions for coating aggregate particulates in accordance with the present invention generally results in a polymer film thickness in the range of from about two to about ten microns. Aggregate particles having a coating thickness of from about three to about eight microns are usually obtained with emulsions containing from about 0.1 to about 1% solids are preferred. In any event, the emulsion selected must have sufficient stability and wetting ability to permit relatively uniform coating of the entire aggregate surface.

Accelerated stripping tests show that polymer emulsion treated aggregate has much greater adhesion to asphalt than the untreated aggregate. Considerably more asphalt is retained on the surface of polymer latex treated aggregate than on untreated aggregate, indicating a strong bond between the asphalt and the thin film deposited on the aggregate.

Particularly good results are obtained with emulsions of polyvinyl acetate, acrylate and methacrylate polymers and copolymers, acrylonitrile copolymers, styrene copolymers, acrylic and methacrylic copolymers, and vinyl acetate copolymers such as poly(ethylene-vinyl acetate). Accordingly, aqueous emulsions of organic solvent-soluble, water-insoluble polymer prepared from vinyl type polymers by an addition polymerization process are preferred.

Modifying agents including plasticizers, such as tricresyl phosphate; organic polymers such as natural and synthetic elastomers; fillers such as finely divided sand or limestone, and agents, such as sulfur may be added individually or in combination to the asphalt in commonly employed quantities to achieve improved properties of the asphalt concrete composition when exigencies of a local climatic problem indicate such additives to be necessary or desirable.

ANTISTRIPPING TESTING PROCEDURES

Tests developed by the Arizona Department of Transportation (ADOT) were used to determine the effectiveness of the present invention in reducing the stripping of asphalt from its associated aggregate.

In the sand stripping test, 2.5 parts of asphalt (by weight) at 140° C. is added to 50 grams of Ottawa sand at 140° C. with vigorous stirring. After cooling for 10 minutes, the mixture is placed in a 4 oz bottle, gently compacted, and thereafter covered with distilled water. The bottle is then heated first at 60° C. for 10 minutes, observed, and thereafter heated at 99° C. for 10 minutes. The last step can be repeated. The relative amounts of coated and uncoated sand are determined visually.

In the accelerated stripping test for asphalt-aggregate mixture, 4.0 grams of asphalt at 135° C. is added with vigorous stirring to 100.0 grams of ¼ inch graded aggregate at 135° C. The resulting sample is placed on weighed aluminum foil. After two hours at room temperature, the sample and foil are placed into a beaker containing 900 ml of distilled water at 80° C. for two minutes to remove coated aggregate from the foil. The foil is then removed from the beaker dried and weighed to determine the amount of adhered asphalt on the foil. A mixture of the coated aggregate in distilled water at 80° C. is vigorously stirred at 2400 rpm with a mechanical mixer. The water is decanted and the mix is placed on aluminum foil and weighed after drying at 135° C. for one hour. The weight of asphalt retained by the aggregate is a measure of the adherence of asphalt to the aggregate.

SCANNING ELECTRON MICROSCOPE STUDIES

Highly polished cubes of granite and limestone cubes about ¼" on an edge were placed in varying concentrations of the dilute polymer emulsion for about an hour. The treated cubes were removed from the emulsion and dried at room temperature. One face of the treated cube was polished and coated with a 200 thick gold film with a Hummer II sputtering device. An International Scientific Instruments Co. Model SS40 electron microscope was used for the reported measurements.

To further assist in the understanding of the present disclosure and not by way of limitation, the following Examples are presented.

EXAMPLE 1

Rhoplex E-300, an acrylic polymer emulsion from Rohm and Haas, was diluted with distilled water to a concentration of 0.1% solids. To 50 parts of Ottawa sand was added 50 parts of the 0.1% emulsion with stirring. After one hour, the coated sand was removed from the mixture by filtration and dried in air. The precoated sand particles were then heated to 140° F. and added with vigorous stirring into 2.5 parts of Huntway AC 20 asphalt. The hot mixture was then spread in a thin layer on a representative substrate and cooled to room temperature. The asphalt concrete thus produced showed excellent adhesion to the aggregate when subjected to the ADOT sand stripping test as described above, as indicated by the fact that essentially all of the sand grains retained an asphalt coating even after being exposed to boiling water. No observable change was noted in the asphalt-sand bonding in the sample after the sample was submerged in water for over a year.

EXAMPLE 2

The procedure of Example 1 was repeated using untreated Ottawa sand in place of the emulsion treated sand to provide a control. When subjected to water at 60° F., most all of the asphalt was removed from the resulting asphalt-sand mixture within 5 minutes.

EXAMPLE 3

Union Carbide styrene-acrylic emulsion UCAR 4426 was diluted with distilled water to a concentration of 0.1% solids. To 100 parts of Salt River ¼" graded aggregate was added 100 parts of the diluted emulsion with stirring. After one hour, the excess liquid was removed by decantation and the precoated aggregate particles dried at room temperature. The precoated aggregate was heated to 135° C.±3° and then admixed with vigorous stirring into 4.0 parts of Sahuaro Petroleum Co. AC-20 asphalt which had been preheated to 135° C.±3°. The thoroughly mixed composition was spread on a smooth substrate surface and allowed to cool to room temperature. In the ADOT accelerated stripping test for the asphalt concrete composition, so formed, over 90.0% of the asphalt was retained by the treated aggregate. In contrast, only 57.7% of the asphalt was retained by the aggregate when untreated aggregate was used.

A limestone cube, cut to about ¼" on each edge, was disposed in a 0.1% emulsion of UCAR 4426 for an hour, removed from the emulsion, and allowed to dry in air. The thin film deposited on the cube had a thickness of 4 to 5 microns when measured using the scanning electron microscope techniques described above.

EXAMPLE 4–10

The procedure of Example 3 was repeated using an emulsion of UCAR 4426 at 2.0 and 0.01 percent solids in emulsion, UCAR 503 at 1.0 and 0.1 percent solids in emulsion, TYLAC 68-603 at 0.5 percent solids in emulsion, RHOPLEX E-300 at 1.0 percent solids in emulsion, and as a control, an aggregate without a polymer coating.

The asphalt concrete compositions were then subjected to the previously described ADOT accelerated anti-stripping tests and the results obtained, using pretreated Salt River aggregate embedded in asphalt, are reported in Table I below.

TABLE I

| Example No. | Diluted Polymer Emulsion from[a] | % Solids in Emulsion | % Asphalt Retained |
|---|---|---|---|
| 4 | UCAR 4426 | 2.0 | 94.9 |
| 5 | UCAR 4426 | 0.01 | 83.2 |
| 6 | UCAR 503 | 1.0 | 96.3 |
| 7 | UCAR 503 | 0.1 | 94.4 |
| 8 | Tylac 68-063 | 0.5 | 92.0 |
| 9 | Rhoplex E-300 | 1.0 | 91.0 |

TABLE I-continued

| Example No. | Diluted Polymer Emulsion from[a] | % Solids in Emulsion | % Asphalt Retained |
|---|---|---|---|
| 10 | Control | 0.0 | 57.7 |

[a]UCAR 4426 is a styrene-acrylic polymer emulsion from Union Carbide and UCAR 503 is an acrylic-terpolymer polymer emulsion from Union Carbide; Tylac 68-063 is a carboxylated polyacrylonitrile emulsion from Reichold Chemical; Rhoplex E-300 is an acrylic polymer emulsion from Rohm and Haas.

The stripping test results demonstrate that considerably more asphalt is retained on the surface of aggregate precoated with the organic polymer emulsions in accordance with the present invention (Examples 4-9) than is retained by the untreated material (Example 10).

The accelerated stripping test results clearly show that aggregate particles which are pretreated with polymer emulsion in accordance with the present invention have remarkably better adhesion than the untreated particles. Considerably more asphalt is retained on the surface of the polymer treated aggregate than was retained on untreated aggregate which demonstrates that a strong bond is created between the asphalt coating and the thin film intermediate coating deposited on the aggregate.

From the foregoing, it is readily apparent that a new and improved asphalt concrete composition and methods of making the same have been herein described and illustrated which fulfill all of the aforestated objects in a remarkably unexpected fashion. It is, of course, understood that such modifications, alterations and adaptations as may readily occur to the artisan confronted with this disclosure are intended within the spirit of the present invention which is limited only by the scope of the claims appended hereto.

Accordingly what is claimed is:

1. A strip-resistant asphalt concrete comprising a particulated aggregate in which each particulate of said aggregate is individually precoated with a thin continuous film of a water-insoluble high molecular weight organic polymer, dried, and thereafter individually embedded in asphalt.

2. An asphalt concrete according to claim 1 in which said organic polymer is selected from the group consisting of: acrylic and methacrylic polymers and copolymers; styrene copolymers; 1,3-diene copolymers; acrylonitrile copolymers; and vinyl acetate copolymers.

3. An asphalt concrete according to claim 1 in which said thin film on each aggregate particulate is from about 2 to about 10 microns in thickness.

4. An asphalt concrete according to claim 1 comprising from about 3% to about 10% (by weight) of asphalt and the remainder is said individually precoated aggregate particulates.

5. An asphalt concrete according to claim 1 in which said high molecular weight organic polymer is soluble in an organic solvent.

6. A strip-resistant asphalt concrete comprising a plurality individually of adherent particulates disposed in asphalt, each particulate comprising: a mineral aggregate core; an intermediate coating surrounding said core, said coating containing an organic solvent-soluble, water-insoluble high molecular weight organic polymer; and an outer coating of asphalt surrounding said intermediate coating.

7. An asphalt concrete according to claim 6 in which said high molecular weight organic polymer is selected from the group consisting of: acrylic and methacrylic polymers and copolymers; styrene copolymers; 1,3-diene copolymers; acrylonitrile copolymers; and vinyl acetate copolymers.

8. An asphalt concrete according to claim 6 in which said intermediate coating measures from about 2 to about 10 microns in thickness.

9. An asphalt concrete according to claim 6 comprising from about 3% to about 10% by weight of asphalt and a remainder of precoated aggregate particulates.

10. A strip resistant asphalt-aggregate composition comprising asphalt and a major amount of mineral aggregate particles, each of which is completely encapsulated with a 2 to 10 micron thick dry film deposited thereon from an aqueous emulsion of a water insoluble, high molecular weight organic polymer.

11. A strip resistant asphalt-aggregate composition according to claim 10 in which said aqueous emulsion contains no more than 2% solids.

12. A strip resistant asphalt-aggregate composition according to claim 11 in which said water insoluble organic polymer is selected from the group consisting of acrylic and methacrylic polymers and copolymers; styrene copolymers; 1,3-diene copolymers; acrylonitrile copolymers; and vinyl acetate copolymers.

13. A strip resistant asphalt-aggregate composition according to claim 12 in which said water insoluble organic polymers have a molecular weight of at least 10,000.

14. A strip resistant asphalt-aggregate composition according to claim 13 in which said aqueous emulsion contains between 0.01 and 1% of said water insoluble organic polymers.

15. A strip resistant asphalt-aggregate composition according to claim 10 in which said water insoluble organic polymer is selected from the group consisting of acrylic and methacrylic polymers and copolymers; styrene copolymers; 1,3-diene copolymers; acrylonitrile copolymers; and vinyl acetate copolymers.

16. A strip resistant asphalt-aggregate composition according to claim 10 in which said water insoluble organic polymers have a molecular weight of at least 10,000.

17. A strip resistant asphalt-aggregate composition according to claim 10 in which said aqueous emulsion contains between 0.01 and 1% of said water insoluble organic polymers.

* * * * *